United States Patent [19]

Khinkis et al.

[11] Patent Number: 4,725,299
[45] Date of Patent: Feb. 16, 1988

[54] GLASS MELTING FURNACE AND PROCESS

[75] Inventors: Mark J. Khinkis, Morton Grove; Hamid A. Abbasi, Westmont, both of Ill.

[73] Assignee: Gas Research Institute, Chicago, Ill.

[21] Appl. No.: 912,085

[22] Filed: Sep. 29, 1986

[51] Int. Cl.⁴ .............................................. C03B 5/235
[52] U.S. Cl. ....................................... 65/134; 65/135; 65/337; 65/347
[58] Field of Search .................. 65/337, 347, 134, 135

[56] References Cited

U.S. PATENT DOCUMENTS

| 2,068,924 | 1/1937 | Mulholland | 65/135 |
| 2,228,347 | 1/1941 | Drake | 65/347 |
| 3,574,585 | 4/1971 | Robertson et al. | 65/135 |
| 3,764,287 | 10/1973 | Brocious | 65/136 |
| 3,836,689 | 9/1974 | Holler et al. | 13/6 |
| 3,856,496 | 12/1974 | Nesbitt et al. | 65/29 |
| 4,029,489 | 6/1977 | Froberg et al. | 65/136 |
| 4,328,020 | 5/1982 | Hughes | 65/27 |
| 4,424,071 | 1/1984 | Steitz et al. | 65/337 |

FOREIGN PATENT DOCUMENTS

| 712980 | 7/1965 | Canada | 65/337 |
| 1582409 | 8/1969 | France | 65/347 |

Primary Examiner—Arthur Kellogg
Attorney, Agent, or Firm—Thomas W. Speckman; Ann W. Speckman

[57] ABSTRACT

A glass melting furnace and process wherein a second combustion zone toward the glass discharge end of the glass melting chamber is underport sideport fired while a first combustion zone toward the batch charge end of the glass melting chamber is side-of-port and/or overport sideport fired.

17 Claims, 1 Drawing Figure

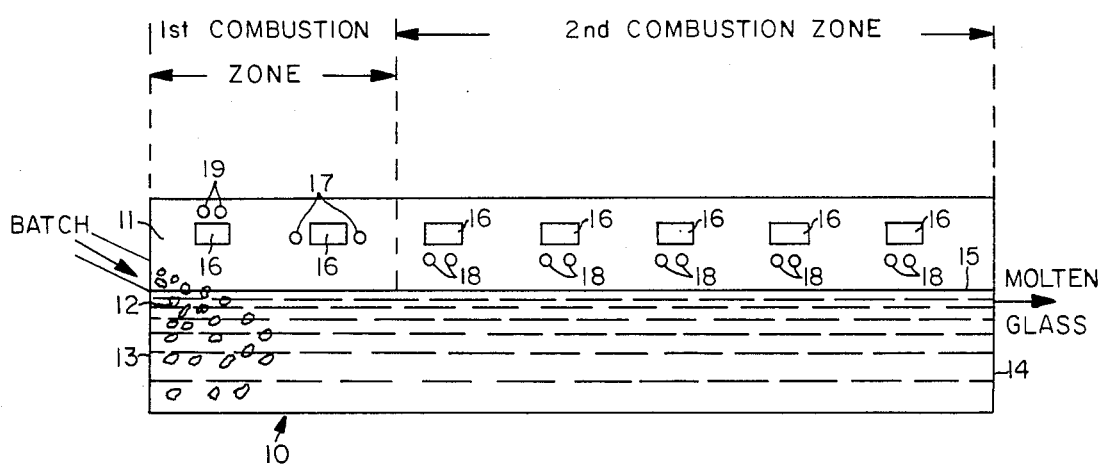

GLASS MELTING FURNACE AND PROCESS

BACKGROUND OF THE INVENTION

1. Field of the Invention

The present invention relates to a glass melting furnace and process which provide an increased glass production rate, thereby enhancing productivity, in addition to reducing pollutant emissions. More specifically, a sideport regenerative glass melting furnace of conventional design is provided with a first combustion zone at the batch charge end of the glass melting chamber which is side-of-port and/or overport fired and a second combustion zone at the glass discharge end of the glass melting chamber which is underport fired.

2. Description of the Prior Art

Glass melting furnaces typically operate at very high temperatures and burn large quantities of fuel to provide the required glass melting temperatures by direct heating. Fuel, typically natural gas or fuel oil, is mixed with sufficient air or other oxygen containing gas to provide complete combustion within the glass melting chamber. Glass batch comprising finely divided particulates is introduced at the charge end of the furnace, and melted, homogenized and refined as it is conveyed along the length of the furnace to the discharge end, where molten glass is discharged for further processing.

Ports are openings through the refractory walls into the interior of the glass furnace through which oxygen containing combustion gas is introduced into the furnace. In a regenerative glass furnace, the ports communicate with the regenerators which capture a portion of the heat contained in the glass furnace exhaust gases to preheat the oxygen containing combustion gas prior to its introduction into the glass melting chamber. Ports may be arranged in the side walls or end walls of the glass melting chamber. Sideport glass furnaces are provided with ports along the side walls of the glass melting chamber between the batch loading end and the opposite molten glass discharge end. Combustible fuel for melting the glass batch is provided by fuel nozzles or burners designed to burn a liquid fuel such as oil, or a fuel gas such as natural gas. At least one fuel nozzle is provided in conjunction with each port for combustion. Side-of-port fired furnaces are provided with fuel nozzles mounted at one or both sides of each port to direct fuel into the oxygen containing combustion gas stream. Underport fired furnaces are provided with fuel nozzles mounted underneath each port directing fuel into the oxygen containing combustion gas stream. Overport fired furnaces are provided with fuel nozzles mounted above each port directing fuel into the oxygen containing combustion gas stream.

Operating conditions within the glass melting chamber promote the oxidation of nitrogen in the combustion gas and fuel to $NO_x$. At the high operating temperatures maintained in glass melting furnaces, substantially all the nitrogen oxidized in conventionally used combustion air forms NO. When exhaust gases containing NO react with cooler gases, NO is converted to $NO_x$, principally $NO_2$, a harmful pollutant. Large volume combustion sources such as glass melting furnaces are subject to strict pollution control regulations, and therefore, controlling pollutant emissions is an important factor.

Conventional endport fired glass furnaces have demonstrated that underport firing increases the efficiency of glass melting processes and reduces $NO_x$ emissions.

Utilizing underport firing with sideport glass furnaces causes problems, however, because underport firing results in higher gas velocities and increased batch entrainment near the charge end of the tank causing higher particulate emissions.

Electrical glass melting and refining furnaces utilizing Joule effect heating have been developed. In most electrically heated furnaces, electrodes are submerged in the molten glass, and molten glass is heated as a result of the passage of electric current therethrough.

U.S. Pat. No. 4,029,489 teaches a glass melting furnace wherein glass is electrically heated from below its upper surface, and is heated from above its upper surface by fossil fuel combustion or heat reflectors. Sideport firing with burners extending through the ports is provided for the length of the furnace away from the charging region which is operated in a cold top melting mode. Heat barriers are provided between the discharge region and the charging region. As the tank is filled, fossil fuel firing is reduced, ports are closed, and full Joule effect heating is achieved, particularly toward the discharge end.

U.S. Pat. No. 3,856,496 teaches an endport fired regenerative glass melting furnace with overport firing in which the angle between each pair of burners is precisely adjusted to increase heat transfer to achieve complete combustion with a reduction in excess oxygen and to avoid impingement on the furnace walls.

U.S. Pat. No. 3,764,287 teaches a glass melting furnace having an induction medium comprising molten metal, the molten glass forming a buoyant layer on top of the induction medium and the furnace being underfired through the bottom wall with fossil fuel, the burners submerged in induction medium.

U.S. Pat. No. 3,836,689 teaches a glass melting furnace for electrically heating molten glass which has a plurality of controlled thermal zones to maintain the desired glass temperature profile. Electrodes are submerged in the molten glass, and the glass is heated by selective regulation of electric current provided to each electrode. U.S. Pat. No. 3,574,585 discloses an electric glass melting furnace utilizing submerged electrodes, the tank divided into at least two zones by a hanging transverse refractory wall.

A glass conditioner located between the melting furnace and glass forming machines for processing molten glass to control uniformity and homogeneity is disclosed in U.S. Pat. No. 4,424,071. The furnace is heated by combustion burners extending through sidewalls above the glass surface and electrical heaters below the glass surface.

U.S Pat. No. 4,328,020 teaches the injection of ammonia into a glass melting furnace exhaust stream to reduce $NO_x$ emissions.

SUMMARY OF THE INVENTION

It is an object of the present invention to provide a glass melting furnace and a firing process which increases heat transfer from flame to the melt, enhances specific glass pull rate and reduces pollutant emissions, particularly $NO_x$.

It is another object of this invention to enhance glass production and reduce pollutant emissions from sideport fired regenerative glass melting furnaces.

It is yet another object of this invention to apply underport firing to sideport regenerative glass furnaces to increase glass production rates and reduce $NO_x$ emissions without increasing batch entrainment near the charge end of the glass melting furnace.

Glass melting furnaces of this invention comprise a glass melting chamber of substantially greater length than width provided with a plurality of ports in the opposite side walls arranged above the level of the glass and extending for substantially the length of the glass melting chamber from the batch charging end to the opposite glass discharge end. The sideports in a first combustion zone comprising about 10 to about 50 percent the total length of the glass melting chamber from the batch charging end are side-of-port and/or overport fired. The sideports in a second combustion zone comprising the remaining about 50 to about 90 percent of the glass melting chamber total length from the discharge end are each at least partially underport fired. This firing arrangement increases glass production rates and decreases pollutant emissions from sideport glass melting furnaces.

As particular glass batch passes through the first combustion zone of the glass melting chamber, it becomes partially melted. Glass batch melted in a tank furnace is first preheated and melted at the top surface exposed to the flame and at the bottom exposed to the already molten glass. Partially melted glass batch forms a layer of molten glass on the upper surface of the glass batch pile in the first combustion zone toward the batch charging end of the glass melting chamber. The layer of molten glass initially formed on the surface of the glass batch pile pours down into the molten glass. Partially melted glass batch passes continuously through the second combustion zone toward the discharge end wherein the glass batch pile is further heated and melted until all glass batch particulates are melted and the particulate glass batch has been transformed to a molten, liquid, homogenized state.

Batch entrainment, which ordinarily results in substantial inefficiencies in underport fired sideport glass melting furnaces does not occur in the glass melting furnace and process of the present invention since glass batch is covered by a layer of molten glass when it enters the underport fired sideport combustion zone. In this way, the advantages of underport firing in sideport combustion are obtained, namely the heat transfer from the flame to the melt is increased, the glass production rate is increased and $NO_x$ emissions are decreased, while batch entrainment remains unchanged. Since the second combustion zone which is underport fired sideport combustion comprises 50 to 90 percent of the total furnace length from the discharge end, overall glass production from the glass furnace is increased, overall $NO_x$ emissions from the glass furnace are reduced while overall batch entrainment is unchanged as compared to side-of-port fired sideport combustion being used for the entire furnace length.

BRIEF DESCRIPTION OF THE DRAWING

The drawing is a schematic side view of a glass furnace showing the features of this invention.

DESCRIPTION OF PREFERRED EMBODIMENTS

The glass melting furnaces and processes of the present invention comprise conventional glass melting chambers having a plurality of sideports located above the surface of the glass batch and molten glass at intervals along the length of the glass melting chamber side walls from the region of batch charging at one end to the region of molten glass discharge at the opposite end. The interior walls, roof and floor portions of the furnace are provided with suitable refractory materials due to the high temperatures required for melting glass. The glass melting furnace of the present invention may have a plurality of chambers, including a glass melting chamber and subsequent glass homogenizing, refining or processing chambers. It is the glass melting chamber, wherein the glass batch particulates are converted to a molten, liquid state, to which the present invention is directed. Regenerative glass melting furnaces are preferred for use in the present invention, and the construction of regenerative sideport glass furnaces is well known to the art. The glass melting furnace may be partitioned above or below the surface of the glass as desired for the particular process.

Glass batch comprising finely divided particulates may be introduced into the charge end of the glass melting chamber by conventional batch feeders. Glass batch generally comprises sand, limestone, soda ash, and the like, the batch composition depending upon the type of glass desired. Many different types of glass and glass batch compositions which are well known to the art may be used. Desired glass batch melting temperatures vary depending upon the composition of the glass batch, and are known to the art. The temperature inside the glass melting chamber is suitably maintained for the desired glass batch composition and firing process. The present invention is applicable to a wide variety of glass batch compositions and treatment processes, and to a wide variety of glass melting furnace configurations.

Important aspects of the glass melting furnace of this invention shown in the drawing are that: charging of glass batch particulates occurs at one end region 11 of an elongated glass melting chamber 10; glass batch 12 is heated as it passes from the charging end 13 to an opposite discharge end 14 of the glass melting chamber; molten liquid glass is withdrawn from the opposite discharge end region of the glass melting chamber; and sideports 16 are provided above the level 15 of the glass at intervals along the length of the glass melting chamber.

Oxygen containing combustion gas, generally air or oxygen enriched air, or air and oxygen separately is introduced through the sideports and directed toward a combustion zone near the glass batch surface. The combustion zone is as close to glass surface as possible without disturbing the flame pattern. The sideports 16 are located on both side walls preferably opposing one another. The dimensions of the ports, and the combustion gas feed rate and composition may vary with the composition and rate of glass batch being melted, the specific process being followed, and the type of fuel used for combustion. Sufficient oxygen is introduced through the ports to promote complete combustion of the fuel in the glass melting chamber.

At least one fuel nozzle is mounted in conjunction with each port to direct fuel into the combustion gas stream for combustion. A single fuel nozzle may be used, while two or more nozzles are preferred. Generally, two nozzles are used for side-of-port and two or three nozzles are used for underport firing. Suitable fuel may comprise natural gas or other gaseous fuels or liquid fuels such as fuel oil.

According to the present invention, a first combustion zone of the glass melting chamber comprising about 10 to about 50 percent and, more preferably, about 20 to about 40 percent the total length of the glass melting chamber, measuring from the batch charging end, is side-of-port sideport fired and/or overport sideport fired by at least one fuel nozzle 17 and 19, respectively, in combination with each port. Fuel is introduced through the fuel nozzles under pressure and directed toward the combustion zone near the glass batch and molten glass surface. Fuel is injected from the fuel nozzles at an angle such that the combustible fuel stream converges with combustion gas near the glass batch and molten glass surface at the desired location for combustion. The dimensions of the fuel nozzles and the fuel feed rate may vary with the composition and volume of the glass batch being melted, the specific process being followed, and the type of combustion gas utilized.

A second combustion zone of the glass melting chamber comprises the remaining about 50 to 90 percent and, more preferably, about 60 to about 80 percent the total length of the glass melting chamber, measuring from the glass discharge end, with each sideport in this zone at least partially underport fired by at least one fuel nozzle 18 arranged underneath each port. It is preferred that each sideport in the second combustion zone is underport fired. Fuel is introduced through the fuel nozzles under pressure and directed toward the combustion zone near the glass batch surface. Fuel is ejected from the underport fuel nozzles at an angle such that the combustible fuel stream converges with combustion gas near the glass batch and molten glass surface at the desired location for combustion. The dimensions of the fuel nozzles and the fuel feed rate may vary with the composition and volume of the glass batch being melted, the specific process being followed, and the type of combustion gas utilized.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A glass melting furnace comprising:
   an elongated refractory lined melting chamber, said melting chamber having a glass batch charging end and an opposite liquid glass discharge end;
   a plurality of sideports along substantially the length of side walls of said elongated melting chamber from said batch charging end to said opposite glass discharge end with means for introducing oxygen containing combustion gas into said melting chamber above the melt level;
   each said sideport in a first combustion zone toward said batch charging end provided with at least one fuel nozzle in combination with said port to provide firing consisting only of at least one of side-of-port firing and overport firing; and
   each said sideport in a second combustion zone toward said glass discharge end provided with at least one fuel nozzle mounted underneath said port to provide firing consisting only of underport firing.

2. A furnace for melting glass according to claim 1 wherein said first zone comprises about 10 to about 50 percent the total length of said melting chamber spaced from said batch charging end and said second zone comprises about 50 to about 90 percent the total length of said melting chamber spaced from said glass discharge end.

3. A furnace for melting glass according to claim 2 wherein said first zone comprises about 20 to about 40 percent the length of said refractory chamber from said batch charging end and said second zone comprises about 60 to about 80 percent the length of said refractory chamber from said glass discharge end.

4. A furnace for melting the glass according to claim 1 wherein each said sideport is provided with two fuel nozzles.

5. A furnace for melting glass according to claim 1 wherein each said sideport is provided with three fuel nozzles.

6. A furnace for melting glass according to claim 1 wherein each said sideport is provided with four fuel nozzles.

7. In a glass melting furnace of the type comprising an elongated melting chamber of substantially greater length than width, said chamber having a glass batch charging end and an opposite discharge end whereat molten glass is withdrawn; and a plurality of sideports in said melting chamber side walls with means for introducing combustion gas into said refractory chamber, each said sideport associated with at least one fuel nozzle with means for introducing pressurized fuel into said melting chamber for combustion, the improvement comprising:
   said fuel nozzles providing firing consisting only of at least one of side-of-port and overport firing in combination with said sideports for combustion in the region of said glass batch charging end of said glass melting furnace; and
   said fuel nozzles providing firing consisting only of underport firing in combination with said sideports for combustion in the region of said glass discharge end of said glass melting furnace.

8. A glass melting furnace according to claim 7 wherein said underport sideport firing region extends about 50 to about 90 percent the total length of said melting chamber from said glass discharge end.

9. A glass melting furnace according to claim 7 wherein said underport firing region extends about 60 to about 80 percent the total length of said melting chamber from said glass discharge end.

10. A glass melting furnace according to claim 7 wherein said at least one of side-of-port sideport and overport sideport firing extends about 10 to about 50 percent of the total length of said melting chamber from said glass batch charging end.

11. A glass melting furnace according to claim 7 wherein said at least one of side-of-port sideport firing and overport sideport firing region extends about 20 to about 40 percent of the total length of said melting chamber from said glass batch charging end.

12. A process for melting glass comprising:
   introducing finely ground loose or compacted glass batch particulates at a batch charging end of a melting chamber;
   preheating and melting the upper surface of said glass batch materials to provide a molten glass surface layer with glass batch particulates underneath in a region toward said batch charging end by firing consisting only of at least one of side-of-port and overport firing;
   passing said glass batch particulates with said molten glass surface layer through a region having firing consisting only of underport fired sideport firing toward an opposite discharge end of said melting chamber;

melting said glass batch materials underneath said molten liquid surface layer in said underport fired sideport region to form molten glass; and withdrawing said molten glass from said discharge end of said chamber.

There should be no charge for the above amendment since it does not alter the total number nor the dependency of the claims.

13. A process of claim 12 wherein said underport fired sideport combustion region extends about 50 to about 90 percent the total length of said melting chamber from said glass discharge end.

14. A process according to claim 12 wherein said underport firing region extends about 60 to about 80 percent the total length of said melting chamber from said glass discharge end.

15. A process according to claim 12 wherein the region of said glass batch charging end has fuel nozzles providing at least one of side-of-port firing and overport firing in combination with said sideports for combustion.

16. A process according to claim 15 wherein said at least one of side-of-port sideport and overport sideport firing extends about 10 to about 50 percent of the total length of said melting chamber from said glass batch charging end.

17. A process according to claim 15 wherein said at least one of side-of-port sideport firing and overport firing region extends about 20 to about 40 percent of the total length of said melting chamber from said glass batch charging end. There should be no fee for this amendment since the total number of claims has been reduced.

* * * * *